U.S. Patent Office
3,682,594
Patented Aug. 8, 1972

3,682,594
PURIFICATION OF SILICON HALIDES
John G. Fish, Garland, Tex., assignor to Texas
Instruments Incorporated, Dallas, Tex.
No Drawing. Filed Nov. 19, 1969, Ser. No. 878,000
Int. Cl. C01b 33/08
U.S. Cl. 423—341
9 Claims

ABSTRACT OF THE DISCLOSURE

Impurities such as boron and aluminum are removed from silicon halide by passing the silicon halide through an adsorbent material formed by the partial pyrolysis of polyacrylonitrile or polymethacrylonitrile. The adsorbent can be either in a particulate form or as fibers in a pressed or woven mat, for example.

---

This invention relates to the preparation of pure silicon. In another aspect, this invention relates to the purification of silicon halides.

Semiconductor grade silicon is conventionally prepared by decomposing silicon halides such as trichlorosilane or silicon tetrachloride with a reducing agent such as hydrogen. However, commercial methods for producing the silicon halides generally retain trace amounts of impurities such as boron and aluminum therein.

Silicon must be of the highest purity for the most sensitive electronic uses. For example, the presence of uncontrolled amounts of impurities in silicon is detrimental for most semiconductor and transistor requirements. The presence of boron is particularly detrimental because boron cannot be removed from solid silicon by conventional purification processes, such as zone refining and repeated crystal pulling.

Therefore, one object of this invention is to provide a method of producing pure silicon suitable for electronic purposes.

Another object of this invention is to provide a novel method of purifying silicon halides.

A further object of this invention is to provide a novel method for removing boron and other metallic impurities such as aluminum, from a silicon halide prior to the conversion of the silicon halide to pure silicon by decomposition in the presence of hydrogen.

According to the invention, impurities such as boron and aluminum are removed from silicon halides by passing the silicon halides in intimate contact with an adsorbent selected from partially pyrolyzed polyacrylonitrile and polymethacrylonitrile.

The polyacrylonitrile generally has a general structural Formula I indicated below, wherein R is a hydrogen atom and $n$ is a large integer. Polymethacrylonitrile will have the same structure except R will be a methyl group:

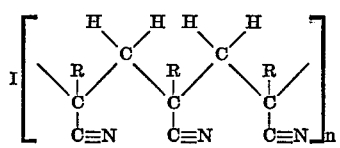

Pyrolysis of these materials will cause ring closure and will result in the linear polymers forming a ladder polymer having the general structural Formula II illustrated below:

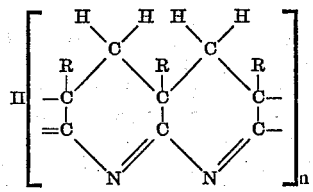

As the charring of the polyacrylonitrile or polymethacrylonitrile proceeds, the material turns from white through yellow, red, purple and to a black brittle resin accompanied by an associated change in electrical properties.

It has been found that the use of the pyrolytic nitrile polymer described above as an adsorbent for removal of contaminants such as boron and aluminum from silicon halide streams is highly efficient and quite superior to some conventional methods.

It is believed that the nitrogen atoms in the cyclic structure shown above, are strong Lewis bases and will readily coordinate with electron deficient compounds, such as boron and aluminum (Lewis acids). The electronic structure of the cyclic compound allows for participation of neighboring pi and non-bonded electrons in a strong coordination bond between the nitrogen atoms and metallic impurities. Thus, a very efficient adsorbent results from the partial pyrolysis of polyacrylonitrile and polymethacrylonitrile.

Even though the nitrile polymers can be pyrolyzed to black brittle resins, it is preferred that the pyrolysis proceed no further than to impart an orange-red hue to the polymer. The pyrolysis operation is of course, a function of both temperature and time. Suitable adsorbents can be produced which can be used in the scope of this invention by heating the polymer in the absence of oxygen for about 3 hours at about 140° C. until it turns to a yellow-orange hue. Heating the polymer for about 9 hours in the absence of oxygen at about 140° C. will impart an orange-red hue thereto. Various other pyrolytic charring conditions can be utilized to yield a cyclic polymer which can be utilized in the scope of this invention.

The pyrolytic nitrile polymer of this invention can be used in various physical forms as an adsorbent for impurities from silicon halide streams. For example, the polymer can be utilized in particulate form in an adsorbent bed of particles ranging in size from about 10 mesh to about 325 mesh (U.S. Standard). Alternatively, the polymer can be utilized in the form of fibers or woven fibers. In the latter instance, one or several layers of woven fiber can be utilized as a filter pad for removing impurities from a silicon halide stream.

It is noted that any liquid or vaporous silicon halide can be purified by the process of this invention. Such silicon halides include dichlorosilane, trichlorosilane, and silicon tetrachloride, for example. The silicon halide can be passed either in liquid or gaseous form in contact with the adsorbent. It is generally preferred that the liquid silicon halide be passed through a mass of particulate pyrolyzed polymer. It is only necessary that intimate contact be made with the polymer and the liquid silicon halide. Alternatively, silicon halide vapors can be passed in contact with the adsorbent material, such as for example, just prior to passing the silicon halide vapors within a vapor phase reactor wherein they are decomposed in the presence of hydrogen to yield pure silicon. In this instance it is generally preferable to maintain the adsorbent bed at a temperature below about 30° C.

It is noted that as adsorbent sites are utilized in a pyrolyzed polymer, a change in the color characteristics of the material occurs. Generally, as the boron adsorption increases, the material will turn lighter in color. For example, noticeable changes occur (decreases) in the infrared adsorption characteristics of the pyrolyzed polymer in the region of 3400 cm.$^{-1}$ and 1200 cm.$^{-1}$ as it becomes contaminated with boron. Thus, the amount of adsorbed impurities in the pyrolyzed adsorbent can be readily monitored by optical or electro-optical colorimetric methods known in the art, such as for example, analysis of infrared adsorption.

After the adsorbent material is substantially contaminated with impurities, it can be either replaced with similar material or regenerated by techniques such as heating in an inert atmosphere to about 75° C. for sufficient time to drive out the impurities, for example, about 1 hour.

Thus, the pyrolyzed polyacrylonitrile or polymethacrylonitrile which is utilized in the scope of this invention for removal of impurities such as boron and aluminum from silicon halides has several distinct advantages over conventional purification materials, in that the subject material has (1) a high density of reactive sites, (2) electrical properties of the adsorbent molecules are such to form very strong bonds between the impurities and the nitrogen atoms therein, and (3) the level of saturation of contaminants in the adsorbent can be readily monitored by electro-optical means.

While this invention has been described in relation to its preferred embodiments, it is to be understood that various modifications will now become apparent to those skilled in the art from a reading of this specification, and it is intended to cover such modifications as fall within the scope of the appended claims.

I claim:

1. A process for the removal of boron-comprising contaminants from a contaminated silicon halide comprising:
   contacting said contaminated silicon-halide with a polymeric compound which includes the following structural unit:

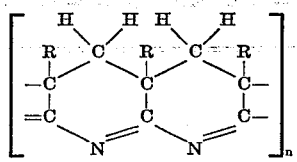

wherein R is hydrogen or a methyl group; and separating a purified silicon halide.

2. The process of claim 1 wherein said compound is in particulate form.

3. The process of claim 1 wherein said compound is in the form of a woven fiber mat.

4. The process of claim 1 wherein liquid silicon halide is passed in contact with said compound.

5. The process of claim 1 wherein vaporous silicon halide is passed in contact with said compound at a temperature of no greater than about 30° C.

6. The process of claim 1 wherein said silicon halide is trichlorosilane.

7. The process of claim 1 wherein said silicon halide is silicon tetrachloride.

8. The process of claim 1 further comprising optically analyzing said compound after said contact to determine the extent of contamination thereof.

9. The process of claim 1 further comprising regenerating said compound after said contacting by heating said compound to a temperature of about 75° C.

References Cited

UNITED STATES PATENTS 2,970,040　1/1961　Conn _____ 23—205
3,016,289　1/1962　Pohl et al. _____ 23—205

OTHER REFERENCES

Chemical Abstracts, M. Nakagawa, "Purification of Silicon Tetrachloride," Kogyo Kagaku Zasshi, vol. 63, 1960, pp. 35–37—Abstract 4346 g, vol. 56, March 1962.

OSCAR R. VERTIZ, Primary Examiner

G. ALVARO, Assistant Examiner

U.S. Cl. X.R.

252—444; 423—349